United States Patent

[11] 3,630,029

| [72] | Inventor | Trevor Stanley Smith<br>Birmingham, England |
|---|---|---|
| [21] | Appl. No. | 2,905 |
| [22] | Filed | Jan. 14, 1970 |
| [45] | Patented | Dec. 28, 1971 |
| [73] | Assignee | Joseph Lucas (Industries) Limited<br>Birmingham, England |

[54] FUEL CONTROLS FOR REHEAT SYSTEMS OF GAS TURBINE ENGINES
16 Claims, 1 Drawing Fig.

| [52] | U.S. Cl. | 60/243, 60/39.28, 137/628 |
|---|---|---|
| [51] | Int. Cl. | F02k 3/10 |
| [50] | Field of Search | 60/39.28, 243; 137/628 |

[56] References Cited
UNITED STATES PATENTS

| 2,851,859 | 9/1958 | Foure | 60/39.28 X |
|---|---|---|---|
| 2,916,876 | 12/1959 | Colley | 60/39.28 |
| 2,970,641 | 2/1961 | Rosen | 60/39.28 |
| 3,158,998 | 12/1964 | Robinson | 60/39.28 X |
| 3,174,281 | 3/1965 | Zeisloft | 60/39.28 |
| 3,204,404 | 9/1965 | Bauger | 60/39.28 X |

*Primary Examiner*—Clarence R. Gordon
*Attorney*—Holman & Stern

ABSTRACT: The invention relates to an apparatus for controlling fuel flow to the burners of the reheat system of a gas turbine engine. The apparatus comprises a main control valve through which all the said fuel flow passes and which has a number of outlets from which fuel passes to associated burners. Control valves in all but one of the lines connecting the main control valve to the burners are arranged to operate in response to the fuel flow in the next preceding line so that fuel is supplied to the burners sequentially. The control valves include biasing means and this biasing is variable by a common actuating device responsive to pressure signals from the engine.

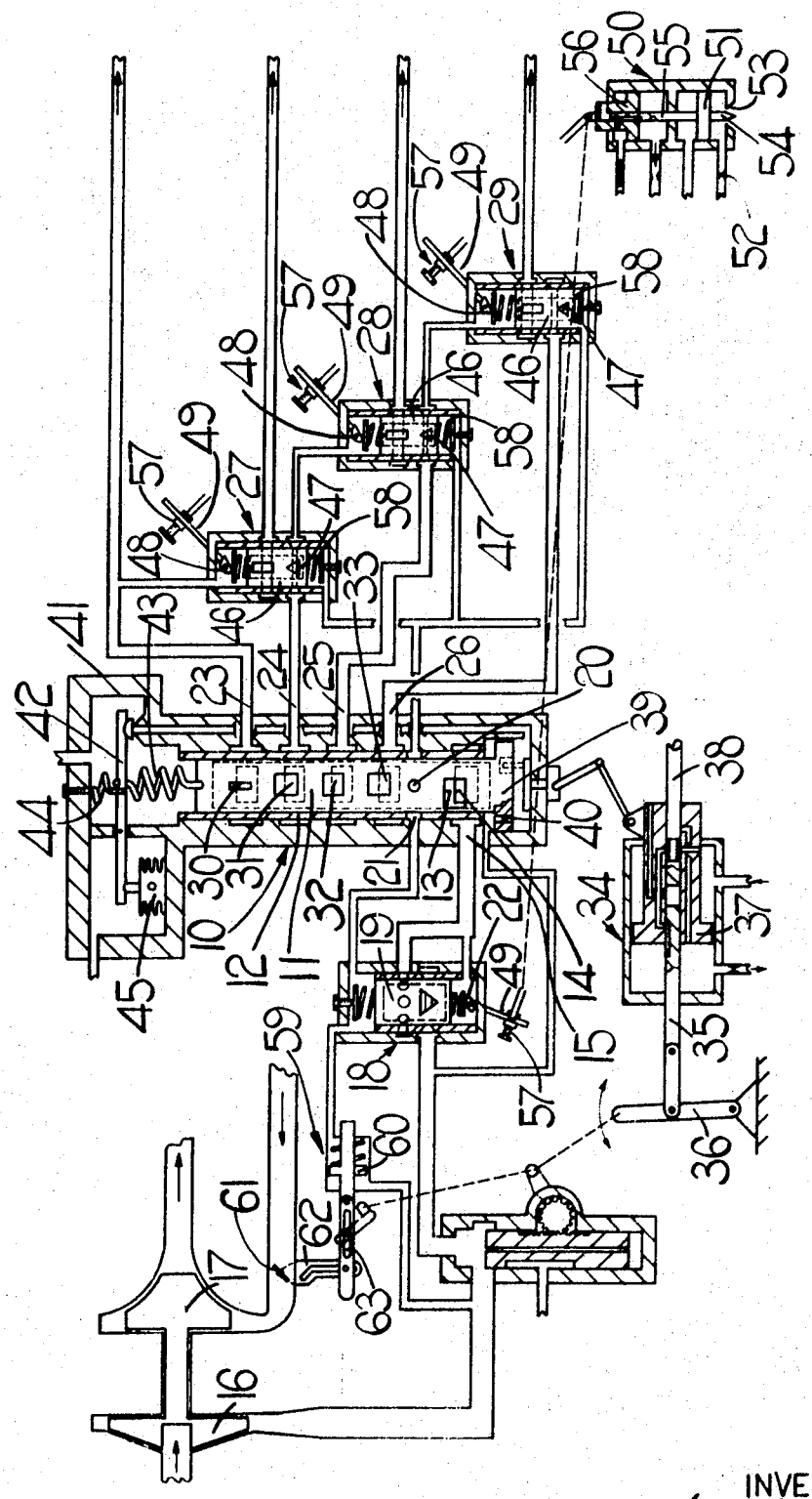

FUEL CONTROLS FOR REHEAT SYSTEMS OF GAS TURBINE ENGINES

This invention relates to fuel controls for reheat systems of gas turbine engines and has as an object to provide such a fuel control in a convenient form.

A fuel control in accordance with the invention comprises a fuel flow control valve for determining the total quantity of fuel to be supplied to the reheat burner of the engine and having at least first, second and third outlets associated respectively with first, second and third supply inlets for the reheat burner, said valve including first, second and third orifices through which fuel flows, in use, to said first, second and third outlets, a first valve including a spring-loaded control member controlling the flow of fuel from said second outlet, said first valve being sensitive to the pressure drop across said first orifice so that fuel does not flow from the second outlet unless the pressure drop across said first orifice is sufficient to overcome the spring-loading the first valve, a second valve including a spring-loaded control member controlling the flow of fuel from the third outlet, said second valve being sensitive to the pressure drop across the second orifice so that fuel does not flow from the third outlet unless the pressure drop across the second orifice is sufficient to overcome the spring-loading of the second valve, said first and second valve having means for varying the spring-loading thereof, and a common actuating device operatively connected to said spring-loading varying means, said actuating device being responsive to signals derived from the the with which t2 control is associated in use.

An example of the invention is illustrated in the accompanying drawing which is a diagrammatic representation of the reheat fuel control.

The control shown includes a fuel flow control valve 10 incorporating a spool 11 which is angularly and axially movable relative to a sleeve 12 in which the spool is slidable. The spool 11 is, in fact, hollow and total fuel flow is determined by overlapping rectangular profile openings 13, 14 in the spool 11 and the sleeve 12 respectively. These openings define in combination a variable area orifice through which fuel under pressure can pass from the inlet 15 of the valve 10 to the interior of the spool 11. Fuel is supplied to the inlet 15 by a centrifugal pump 16 driven by an air turbine 17. Fuel passes from the pump 16 to the inlet 15 through a pressure drop control valve 18 which has a control element 19 movable to reduce fuel flow to the inlet 15 by the fuel pressure at inlet 15 and to increase fuel flow to the inlet 15 by the pressure within the spool 11, a suitable connection between the interior of the spool 11 and the valve 18 being made via ports 20 in the spool 11 and an annular groove 21 in the sleeve 12. The control element 19 is spring-loaded and has a spring-load varying cam 22 actuable by a lever 49.

The valve 10 has four outlets 23, 24, 25 and 26. The outlet 23 is connected, in use, directly to a first inlet of the reheat burner. The outlets 24, 25 and 26 are connected via valves 27, 28 and 29 respectively to second, third and fourth inlets of the reheat burner. Communications between the interior of the spool 11 and the outlets 23, 24, 25 and 26 is established through orifices 30, 31, 32 and 33 respectively. The areas of these orifices are variable as a result of the coaction of the spool 11 with the sleeve 12 by axial movement of the spool 11, but angular movement thereof does not affect the areas.

Angular movement of the spool 11 is controlled by a servomechanism 34. This servomechanism has a mechanical input member 35 coupled to pilot's lever 36. A piston 37 is arranged in known manner to follow movements of the input member 35. There is, however, a second mechanical input member 38 which is coupled to the final jet pipe nozzle control mechanism of the engine with which the system is to be used. Movement of the piston 37 to the left to increase fuel flow is limited by the input member 38, so that fuel flow cannot be increased beyond a limit set by the existing position of the final nozzle.

Axial movement of the spool 11 is effected by means of a piston 39 thereon which is subjected to pressure tapped from the upstream side of valve 18 on its upper, smaller area face to urge the spool in a direction such that the area of the orifices 13, 14 and the areas of orifices 30, 31, 32 and 33 are increased. The pressure on the other side of piston 39 is generated by fuel flow through an orifice 40 in the piston and through a variable orifice 41 in series. The orifice 41 is variable by means of a lever 42. A spring 43 acts between the lever 42 and the spool 11 to urge the lever in a direction to close the orifice 41 and to raise the spool (i.e., to move the spool in a direction to decrease fuel flow). A further spring 44 acts on lever 42 to urge it in the opposite direction. The lever 42 is acted upon by an evacuated bellows 45 the exterior of which is subjected to an air pressure signal derived from the delivery side of the compressor of the engine with which the control is employed.

It will be appreciated that the spool 11 will be in equilibrium when the orifice 41 is sufficiently open to allow sufficient flow through the orifice 41 to generate a pressure drop therethrough which compensates for the difference between the areas of the upper and lower sides of the piston 39, and the effect of the spring 43 of the spool. The spring forces acting on the lever 42 will exactly counterbalance the force applied thereto by the bellows 45. Any increase in the air pressure signal referred to will cause opening of orifice 41, which will, in turn, cause the pressure drop across the orifice 40 to increase. Thus the spool will move downwardly until the increased load applied to the lever 42 causes the orifice 41 to be closed sufficiently for equilibrium to be restored. Similarly a decreasing air pressure signal causes upward movement of the spool 11.

Each of the valves 27, 28 and 29 comprises a spring-loaded control member 46 which has an orifice 47 controlling fuel flow. Fuel flow is increased in each case by upward movement of the control member 46. In each case the underside of the control member 46 is subjected to the fuel pressure which is present inside the spool 11, connections to the annular groove 21 being made for this purpose. The upper ends of the control member 46 of the three valves 27, 28 and 29 are subjected to the pressures at outlets 23, 24 and 25 respectively. Hence, the net effect of the fuel pressures on the valves 27, 28 and 29 is governed by the pressure drops through orifices 30, 31 and 32 respectively.

The spring-loading of each valve 27, 28, 29 is variable by means of a cam 48 actuable by a ever 49. All the levers 49 are linked to a common actuating device 50. The device 50 includes an air-operated piston and cylinder unit to one side of the piston 51 of which an air pressure signal derived from the engine immediately upstream of the reheat burners is applied. The other side of the piston is connected via a restrictor 52 to a tapping on the delivery side of the engine compressor. This other side of the piston 51 is also vented through an orifice 53 controlled by a tapered needle 54 on the piston 51. For any value of the ratio of the air pressure signals applied to the piston 51 there will be a corresponding equilibrium position of the piston 51 such that the pressures on opposite sides of piston 51 are equal. The piston 51 will rise (as viewed in the drawing) as the compressor delivery pressure rises (unless there is a proportional rise in the reheat chamber pressure).

The piston 51 has a piston rod 55 which controls a conventional followup servo piston 56 operated by pressurized fuel. The piston 56 will also rise as the compressor delivery pressure rises and is linked to the valves 27, 28 and 29 so that the spring loading of these valves urging the valves towards closed positions is increased as the piston 56 rises. There are independently adjustable connections 57 between the levers 49 and the links connecting these levers to the piston 56. In addition the springs 58 which act on the valve control members 46 to urge these towards their open positions can be independently adjusted.

There is also a servo device 59 which operates a throttle valve 61 in the air supply to the air turbine 17. The servodevice 59 comprises a piston 60 to one side of the full output pressure of the pump 16 is applied. Fuel pressure from the groove 21 is applied to the other side of the piston 60. The piston 60 is spring-loaded in the direction in which it is urged by the latter fuel pressure. The piston 60 is connected to the air throttle 61 by means of a slotted arm 62 which turns the throttle 61 and a link 63. The link 63 is pivotable by the pilot's lever so as to vary the radial distances between the axis of the throttle 61 and the point of action of the link 63 on the arm 62.

In use the valve spool 11 will be positioned, as mentioned above, in accordance with the settling of the pilot's lever, the setting of the final nozzle and the compressor delivery pressure. Initially, i.e., when fuel flow is low, all the fuel will be delivered to the first outlet 23. As the total fuel flow increases the pressure drop across orifice 30 increases until the valve 27 starts to open. Similarly the valves 28 and 29 will start to open at total fuel flow values dependent upon the value of the compressor delivery pressure sensed by the bellows 45 and also dependent on the value of the pressure ratio sensed by the device 50.

The throttle valve 61 is automatically adjusted to ensure that the pump speed is sufficient to supply the required amount of fuel at the necessary pressure.

Having thus described my invention what I claim as new and desire to secure by Letters Patent is:

1. A fuel control for a reheat system of a gas turbine engine comprises a fuel flow control valve for determining the total quantity of fuel to be supplied to the reheat burner of the engine, and having at least first, second and third outlets associated respectively with first, second and third supply inlets for the reheat burner, said valve including first, second and third orifices through which, in use, fuel flows to the first, second and third outlets respectively, a first valve including a spring-loaded control member controlling the flow of fuel from said second outlet, said first valve being sensitive to the pressure drop across said first orifice so that fuel does not flow from the second outlet unless the pressure drop across said first orifice is sufficient to overcome the spring-loading of the first valve, a second valve including a spring-loaded control member controlling the flow of fuel from the third outlet, said second valve being sensitive to the pressure drop across the second orifice so that fuel does not flow from the third outlet unless the pressure drop across the second orifice is sufficient to overcome the spring-loading of the second valve, said first and second valve having means for varying the spring-loading thereof, and a common actuating device operatively connected to said spring-loading varying means, said actuating device being responsive to signals derived from the engine with which the control is associated in use.

2. A fuel control as claimed in claim 1 in which the said flow control valve includes a fourth orifice through which, in use, fuel flows to a fourth outlet associated with a fourth supply inlet for the reheat burner.

3. A fuel control as claimed in claim 2 which includes a third valve including a spring-loaded control member controlling the flow of fuel from the said fourth outlet, the said third valve being sensitive to the pressure drop across the said third orifice so that fuel does not flow from the fourth outlet unless the pressure drop across the third orifice is sufficient to overcome the spring-loading of the third valve, the said third valve having means for varying the spring-loading thereof and the said common actuating device is operatively connected to the spring-load varying means of the said third valve.

4. A fuel control as claimed in claim 1 in which the said fuel flow control valve comprises a hollow spool within a sleeve, the said sleeve and spool cooperating to define the orifices associated with the said outlets.

5. A fuel control as claimed in claim 4 in which the sleeve and spool also defined an inlet orifice through which the said total quantity of fuel passes to the interior of the spool.

6. A fuel control as claimed in claim 4 in which the spool is angularly movable relative to the sleeve to vary the size of the inlet orifice and axially movable relative to the sleeve to vary the sizes of the orifices associated with the said outlets.

7. A fuel control as claimed in claim 6 in which the axial position of the spool is dependent n the magnitude of an air pressure signal derived from the engine.

8. A fuel control as claimed in claim 7 in which the said air pressure signal is derived from the delivery side of the compressor of the engine.

9. A fuel control as claimed in claim 6 in which the angular position of the spool depends on the position of a control lever and on the position of a jet pipe control nozzle on the engine.

10. A fuel control as claimed in claim 1 which includes a pressure drop control valve through which, in use, fuel is supplied to the said supply control valve, the said pressure drop control valve having a spring-loaded control member controlling the flow of fuel to the said supply control valve, the said pressure drop control valve being sensitive to the pressure drop across an inlet to the supply control valve and having means for varying the spring-loading thereof, the said common actuating device being operatively connected to the spring-loading varying means of the said pressure drop control valve.

11. A fuel control as claimed in claim 1 which includes a centrifugal pump for supplying fuel to the said fuel flow control valve and a means responsive to the output pressure of the pump and to the pressure within the fuel flow control valve to vary the power input to the pump.

12. A fuel control as claimed in claim 1 in which the said common actuating device includes a followup servo piston energized by fuel pressure derived from a main fuel supply to the engine.

13. A fuel control as claimed in claim 1 in which the signals to which the said common actuating device is responsive are air pressure signals derived respectively from the delivery side of the compressor and from immediately upstream of the reheat burners.

14. A fuel control as claimed in claim 1 which includes an independently adjustable connection between each said spring-load varying means and its operative connection to the common actuating means.

15. A fuel control as claimed in claim 1 in which each said spring-load varying means comprises a cam rotatable by a lever.

16. A fuel control as claimed in claim 15 in which each said lever is operatively connected by means of a link to the common actuating device.

* * * * *